Sept. 26, 1933.  A. WITTBERGER  1,928,324
DOUBLE BAND INTERNAL EXPANDING CLUTCH
Filed July 3, 1930  2 Sheets-Sheet 1

INVENTOR
A. Wittberger

Roth & Roth
ATTORNEYS

Sept. 26, 1933.  A. WITTBERGER  1,928,324
DOUBLE BAND INTERNAL EXPANDING CLUTCH
Filed July 3, 1930  2 Sheets-Sheet 2
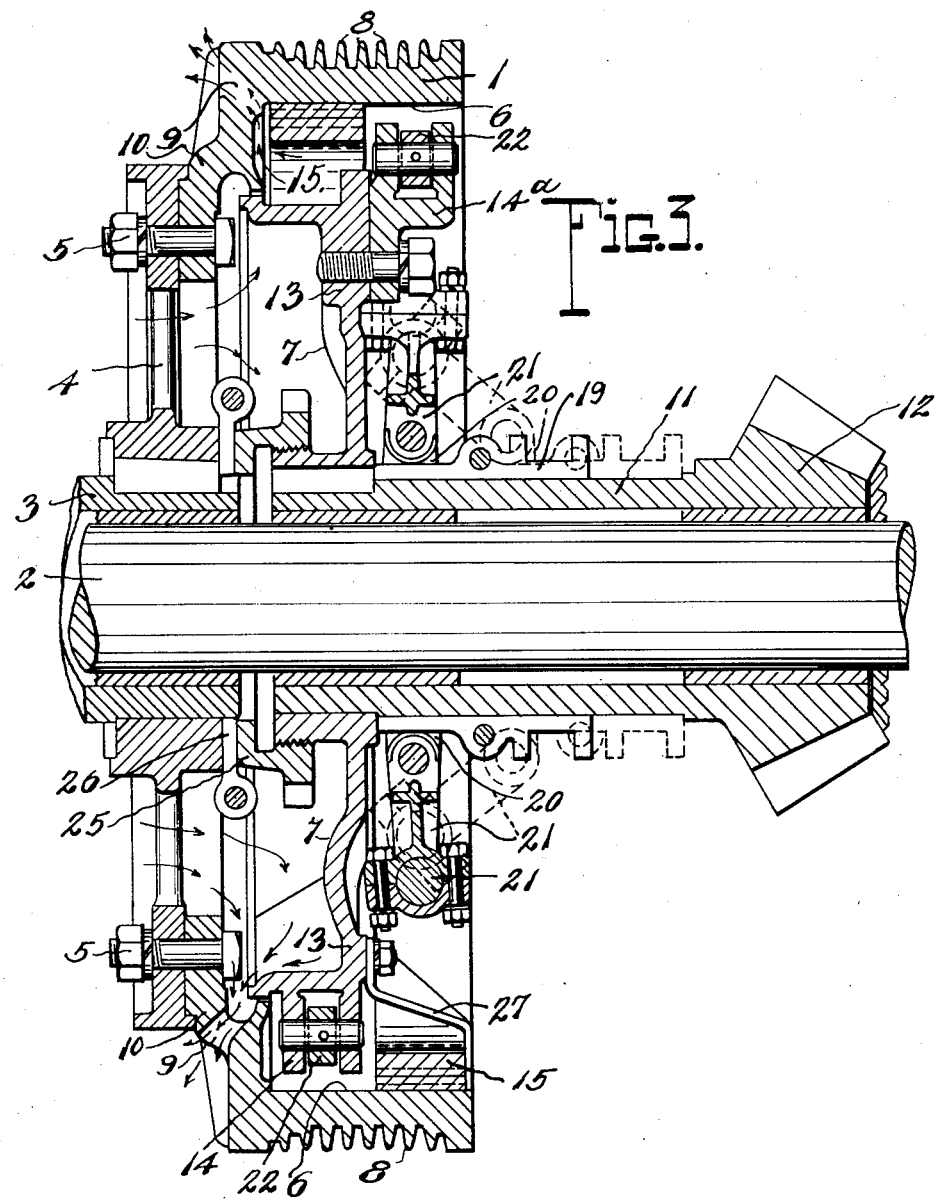
INVENTOR
A. Wittberger
BY
Robb & Robb
ATTORNEYS Patented Sept. 26, 1933

1,928,324

UNITED STATES PATENT OFFICE 1,928,324

DOUBLE BAND INTERNAL EXPANDING CLUTCH

Anton Wittberger, Milwaukee, Wis., assignor to Koehring Company, Milwaukee, Wis., a corporation Application July 3, 1930. Serial No. 465,659

4 Claims. (Cl. 192—77)

This invention relates to internal expanding band clutches and more particularly to clutches for use with cranes, excavating machinery and the like.

In clutches of the internal expanding band type, considerable difficulty is experienced in maintaining a complete and substantially uniform frictional contact between the clutch band and the friction driving drum during clutch engagement. The reason for this is that in clutches of the usual type the friction clutch bands are pivotally secured to a central spider at their dead ends. This pivotal connection is at a fixed radius from the center of rotation of the spider and consequently any wear taking place in the bands or at the pivotal connection referred to, will cause a relative reduction in the frictional contact at this end of the band.

In addition to the above, difficulty is often experienced when the bands are "released" since the clearances adjacent to the dead ends between the bands and the drum are usually very small in order to attempt to provide for proper contact adjacent to the dead ends when the bands are in expanded frictionally engaged position. Under these conditions, it is found that the bands will not completely disengage at times and considerable frictional drag between the driver and driven members of the clutch is experienced. This results in the necessity of providing a brake element to prevent the driven member from rotating and also causes excessive wear on the bands adjacent to the dead ends. As a result of this wear, the bands do not wear down uniformly and the engaging portions of the bands adjacent to the dead ends soon become more or less inoperative, reducing materially the efficiency of the clutch.

An object of my invention is to completely eradicate the above difficulties by constructing a clutch device of the internal expanding band type especially adapted for use with excavating machinery, in which complete clutch engagement between the band and the internal friction driving surface of the drum is effected when the clutch is engaged. When the clutch is disengaged, the clutch band will be caused to completely disengage the driving drum, whereby to eliminate any drag whatsoever between the driver and driven members.

Another object is to provide a clutch device of the internal expanding band type which is self-adjusting to provide substantially uniform frictional contact over the entire friction surface of the band member during clutch engagement.

A further object is to provide a driving drum having an internal friction surface, and a driven member provided with an expanding friction clutch band, the normal radius of which is somewhat less than the radius of the internal friction clutch surface, whereby when the band is disengaged from the friction surface of the drum, the band will become substantially self-contracting to effect a quick and complete release thereof with respect to the friction surface.

A still further object is to provide an internal expanding friction band clutch in which the bands are pivotally secured at their dead ends to the driven member through an intermediate link member, whereby during clutch engagement the dead ends of the bands are caused to move outwardly into engagement with the friction surface, and upon release of the bands the dead ends thereof are caused to move inwardly away from the friction surface of the drum.

Another object of the invention is to utilize the frictional contact between the expanding band and the rotating driver during engagement of the clutch to assist in effecting relative outward movement of the dead end of the band and the frictional engagement thereof with respect to the driving drum adjacent to this end.

Other and further objects and advantages of the invention will be hereinafter set forth and the novel features thereof defined by the appended claims.

In the drawings:—

Fig. 1 is an elevation of my improved internal expanding band clutch, the central shaft and sleeve being shown in section and the clutch being shown in engaged position;

Fig. 2 is a fragmentary elevation of a portion of my clutch, showing the bands and actuating parts in disengaged position; and Fig. 3 is a section taken approximately on the plane indicated by the line 3—3 of Fig. 1.

Like reference characters refer to like parts in the several figures of the drawings in which 1 indicates the driver of the clutch device which is rotated in the direction of the arrow A. This driver, as seen in Fig. 3, is rotatably carried on the shaft 2 by a driving sleeve 3 which is keyed to the driving flange plate 4 and in turn secured adjacent to its periphery to the driver by any suitable means such as bolts 5. The driver is provided with an interior cylindrical friction drum surface 6 for accommodating the clutch device, indicated generally at 7. The exterior periphery of the driver 1 is provided with heat radiating or dispensing ribs or flanges 8 and air passages 9 located at one side thereof between the friction surface 6 and the supporting flange 10 connecting the driving flange plate with the driver. The driven member, indicated generally at 7, is carried by the sleeve 11 which is rotatably mounted on the shaft 2. This sleeve 11 is provided at one end with a driving bevel pinion 12 for any suitable power take-off such as the drive to the traction devices of an excavating machine or for swinging the car body of an excavator with relation to the traction devices. The sleeve 11 has secured thereto at its opposite end a friction band supporting unit 13 which is provided with apertured arms or brackets 14, 14a to which the dead ends 15a of the friction bands 15 are indirectly secured. The friction band supporting unit is also provided with the fixed bearings 16 in which are journaled the band actuating bell cranks 17, as seen in Figs. 1 and 2.

The bell cranks 17 are pivotally secured by the adjusting bolts 18 to the live ends 15c of the friction bands 15, and actuation of the bell cranks 17 is obtained through a clutch shifter collar 19 and an intermediate self-equalizing shifter yoke 20 and toggle links 21.

The dead ends 15a of the clutch bands 15 are secured to the arms 14, 14a through intermediate link members 22. It will be seen that the bands extend unbrokenly around the greater part of the circumference to an extent not less than 300°, and in order to limit the inward movement of the bands 15 when the clutch is disengaged, I provide radial stop members 23 which are suitably secured at 24 to the friction band supporting unit 13, as seen in Fig. 1. These stop members are adjustable and comprise the bolts 23a which may be screwed in and out of the body portion of the stop members as desired and when the proper adjustment has been made, the lock nuts 23b may be tightened up to hold the bolts in proper adjusted position. Adjustment of the live ends 15c of the bands 15 is obtained by turning the adjusting nuts 18a, thereby moving the adjusting bolts 18 with respect to the bell cranks 17, until the desired adjustment of the bands has been made, after which the nuts may be tightened up to maintain the bands in proper relation with respect to the friction surface 6 of the driver or drum and the bell cranks. The bands 15 are initially formed so that the radius thereof is slightly less than the radius of the interior cylindrical friction surface of the driver or drum 1 in order that upon release of the bands incident to actuation in a counterclockwise direction of the bell cranks 17, there is a natural tendency of the bands to contract to their initial radius.

In order to permit each of the dead ends of the bands to completely disengage the frictional surface 6 of the driver, link members 22 are provided. The relation of the pivotal center between the link member 22 and the arm 14a with the pivotal center between the link member 22 and the dead end 15a of the band 15 and the line of thrust, is such that upon actuation of the bell crank 17 in a clockwise direction, the thrust of the link member on the live end of the band will cause the dead end to move outwardly into engagement with the friction surface. The relative engagement between the band and the rotating friction surface of the driver is such as to maintain the proper relative contact between the band and driving surface adjacent to the dead end.

Fig. 2 discloses the upper portion of the parts as seen in Fig. 1, the clutch being in disengaged position, and by reference to these two figures, it will be observed that upon actuation of the bell cranks 17 in a counterclockwise direction, the live ends 15c of the bands will be pulled inwardly, causing the bands to engage the stop members 23, 23a, whereupon the inward movement of the bands will be limited, and they will be caused to slide in a direction reverse to the arrow A along the stop members 23, 23a, causing the dead ends 15a to move inwardly and completely disengage the bands with relation to the friction surface 6 of the driver 1.

The friction band supporting unit 13 is provided at its hub portion with an adjustable thrust member 25 for engaging the thrust washer 26 located between the flange plate of the driver and the friction band supporting unit of the driven member.

A resilient plate 27 for suitably positioning the intermediate portion of the band 15 with respect to the driver 1 is carried by the friction band supporting unit. This plate 27 engages the outside face of the band 15 and prevents outward movement thereof.

While the specific details of construction have been herein shown and described, the invention is not confined thereto as changes and alterations may be made without departing from the spirit thereof as defined by the appended claims.

Having thus described my invention, what I claim as new and desire to secure by Letters Patent is:

1. In an internal band clutch of the class described, a driving member having an internal friction surface, a driven member, a pair of friction bands carried by said driven member adapted to engage the friction surface of the driving member, said bands having radii of curvature shorter than the radius of curvature of the friction surface of the driving member, a pair of links secured to said driven member, said links being secured to one end of each band respectively and extending from its connection with the driven member in a direction opposite to the direction of rotation of the driving member, and adjustable band actuating means carried by the driven member and connected to the other end of the bands for causing radial movement and circumferential movement in the direction of rotation of the driving member of the band to effect expansion thereof into frictional contact with the friction surface of the driving member.

2. In an internal band clutch of the class described, a driving member having an internal friction surface, a driven member, a pair of friction bands carried by said driven member adapted to engage the friction surface of the driving member, said bands having radii of curvature shorter than the radius of curvature of the friction surface of the driving member, a pair of links secured to said driven member, said links being secured to one end of each band respectively and extending from its connection with the driven member in a direction opposite to the direction of rotation of the driving member, adjustable band actuating means carried by the driven member and connected to the other end of the bands for causing radial movement and circumferential movement in the direction of rotation of the driving member of the band to effect expansion thereof into frictional contact with the friction surface of the driving member, and equalizing means connecting the band actuating means, including as self-equalizing shiftable toggle mechanism to effect self-equalizing engagement of the bands upon actuation thereof.

3. In an internal band clutch of the class described, a driving member having an internal friction surface, a driven member, a pair of friction bands carried by the driven member and adapted to engage the friction surface of the driving member, said friction bands occupying different planes each presenting an operative uninterrupted friction surface to the friction surface on the driving member of at least 300°, adjustable band actuating means carried by the driven member and a self equalizing mechanism connected to the band actuating means, and instrumentalities for pressing the bands upon actuation thereof against the friction surface on the driving member.

4. In an internal band clutch of the class described, a driving member having an internal friction surface of substantial width, a driven member, a pair of friction bands carried by the driven member and adapted to engage the friction surface of the driving member in different planes, said friction bands presenting to the friction surfaces on the driving member an oppositely combined friction surface each of at least 300°, an adjustable band actuating means carried by the driven member, a self-equalizing member connected to the band actuating means, and adjustable instrumentalities for uniformly pressing the bands upon actuation thereof against the friction surface on the driving member.

ANTON WITTBERGER.